United States Patent [19]
Pasquini

[11] Patent Number: 4,782,445

[45] Date of Patent: Nov. 1, 1988

[54] CONTROL APPARATUS FOR COOKING APPARATUS

[75] Inventor: Mario Pasquini, Milford, Conn.

[73] Assignee: Food Automation-Service Techniques, Inc., Stratford, Conn.

[21] Appl. No.: 943,949

[22] Filed: Dec. 18, 1986

[51] Int. Cl.[4] .......................... G06F 15/20; H05B 1/02
[52] U.S. Cl. ..................................... 364/400; 219/494; 364/557; 377/25
[58] Field of Search ............... 364/477, 400, 153, 154, 364/577, 557; 219/494, 506, 490, 441, 442; 377/1, 2, 19, 25; 99/325-328

[56] References Cited

U.S. PATENT DOCUMENTS

| | | | |
|---|---|---|---|
| 4,301,509 | 11/1981 | Haase et al. | 364/400 |
| 4,437,159 | 3/1984 | Waugh | 364/400 |
| 4,636,949 | 1/1987 | Longabaugh | 364/400 |
| 4,648,055 | 3/1987 | Ishizaka et al. | 364/557 |
| 4,663,710 | 5/1987 | Waugh et al. | 364/400 |
| 4,688,475 | 8/1987 | Witt et al. | 99/325 |

Primary Examiner—Joseph Ruggiero
Attorney, Agent, or Firm—Felfe & Lynch

[57] ABSTRACT

Apparatus for averaging the temperatures of a plurality of temperature probes in an oven automatically eliminates the temperature readings of probes outside a predetermined temperature differential from the probe temperature average. The apparatus utilizes a microcomputer to provide high energy load minimization for an oven with multiple heating capabilities.

32 Claims, 6 Drawing Sheets

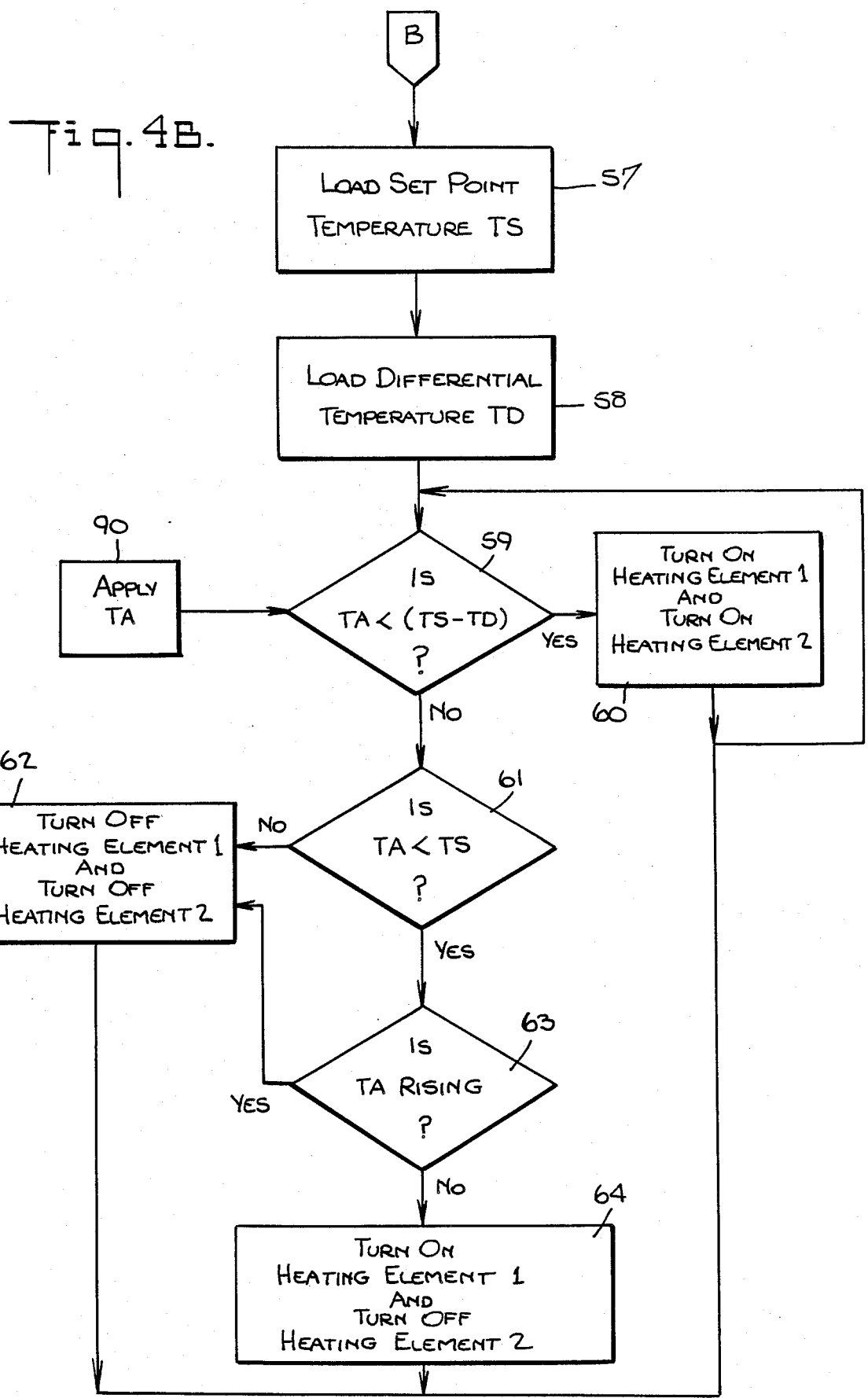

CONTROL APPARATUS FOR COOKING APPARATUS

BACKGROUND OF THE INVENTION

This invention relates to apparatus for averaging the temperatures of a plurality of temperature probes in an oven and to apparatus for controlling the temperature of the oven and to apparatus for controlling the steam in the oven. More particularly, the invention relates to control apparatus for baking ovens comprising a microcomputer particularly useful for controlling and optimizing the performance of large baking ovens.

Heretofore, commercial baking ovens have been used by experienced bakers to cook a variety of breads and pastries primarily by eye. However, such manual operation is subject to error by the operator and the operating cost is greater than is desirable.

It is an object of the present invention, therefore, to provide a new and improved oven control apparatus which avoids one or more of the disadvantages of prior oven controls.

It is another object of the invention to provide a new and improved apparatus for averaging the temperatures of a plurality of probes in an oven.

It is another object of the invention to provide a new and improved apparatus for averaging the temperature of a plurality of selected temperature probes in an oven.

It is another object of the invention to provide a new and improved apparatus for automatically eliminating the temperature readings of probes outside a predetermined temperature differential from the probe temperature average.

It is another object of the invention to provide high energy load minimization for ovens with multiple heating capabilities.

It is another object of the invention to provide new and improved apparatus for controlling the steam in an oven.

SUMMARY OF THE INVENTION

In accordance the invention, apparatus for averaging the temperatures of a plurality of temperature probes in an oven comprises means for counting the number Y of Y probes in the oven and for storing the number Y thereof and for indicating individual probes successively. The apparatus also includes means for reading the temperature of each probe indicated by the Y probe counting and storing means, and means for decrementing the Y probe counting and storing and probe-indicating means. The apparatus also includes means for determining whether the Y probe counting and storing and probe-indicating means has been decremented to zero. The apparatus also includes means for averaging the temperatures of the Y probes when the Y probe counting and storing and probe-indicating means has been decremented to zero.

Also in accordance with the invention, apparatus for averaging the temperatures of a plurality of selected temperature probes in an oven comprises means for counting the number Y of Y probes in the oven and for storing the number Y thereof and for indicating individual probes successively. The apparatus also includes means for reading the temperature of each probe indicated by the Y probe counting and storing means, and means for counting a number of N selected probes. The apparatus also includes means for incrementing said N selected probe counting means and means for decrementing said Y probe counting and storing and probe indicating means. The apparatus also includes means for reading the temperature and storing the reading of the number N of the N selected probes. The apparatus also includes means for determining whether the Y probe counting and storing and probe indicating means has been decremented to zero. The apparatus also includes means for averaging the temperatures of the N selected probes when the Y probe counting and storing and probe indicating means has been decremented to zero.

Also in accordance with the invention, apparatus for controlling the temperature of an oven having a plurality of heating means comprises means for selecting a product to be heated at a predetermined temperature TP. The apparatus also includes means for causing a set point temperature TS to be equal to the predetermined heating temperature TP. The apparatus also includes setback counting means for counting the time interval between the time when the product-selecting means has selected a product to be heated and the end of a predetermined setback interval and for causing the set point temperature TS to be equal to a predetermined setback temperature TSB which is less than the predetermined heating temperature TP, overriding the means for causing the set point temperature TS to be equal to the predetermined heating temperature TP, thereby reducing power consumption.

Also in accordance with the invention apparatus for controlling the steam in an oven, comprises means for averaging the temperatures of N selected temperature probes in an oven to provide an average temperature TA. The apparatus also includes means for determining whether the average temperature TA is less than or equal to a set point temperature TS and whether the average temperature TA is greater than the set point temperature TS minus a temperature differential TD. The apparatus also includes means for determining whether a product to be processed in the oven has been selected and means for determining whether the apparatus is operating in a setback temperature TSB mode when the product has been selected. The apparatus also includes means responsive to a signal that the apparatus is not operating in a setback temperature mode for timing the processing of the selected product and means for timing the injection of steam into the oven.

BRIEF DESCRIPTION OF THE DRAWINGS

Referring now to the drawings;

FIG. is a diagrammatic perspective view of a baking oven including a plurality of spaced temperature probes coupled to temperature sensor circuits;

FIGS. 3, 4A, 4B are flow charts comprising a representation of a portion of a microcomputer which operates according to a computer program produced according to the flow charts;

DESCRIPTION OF THE PREFERRED EMBODIMENTS

Figure 1:
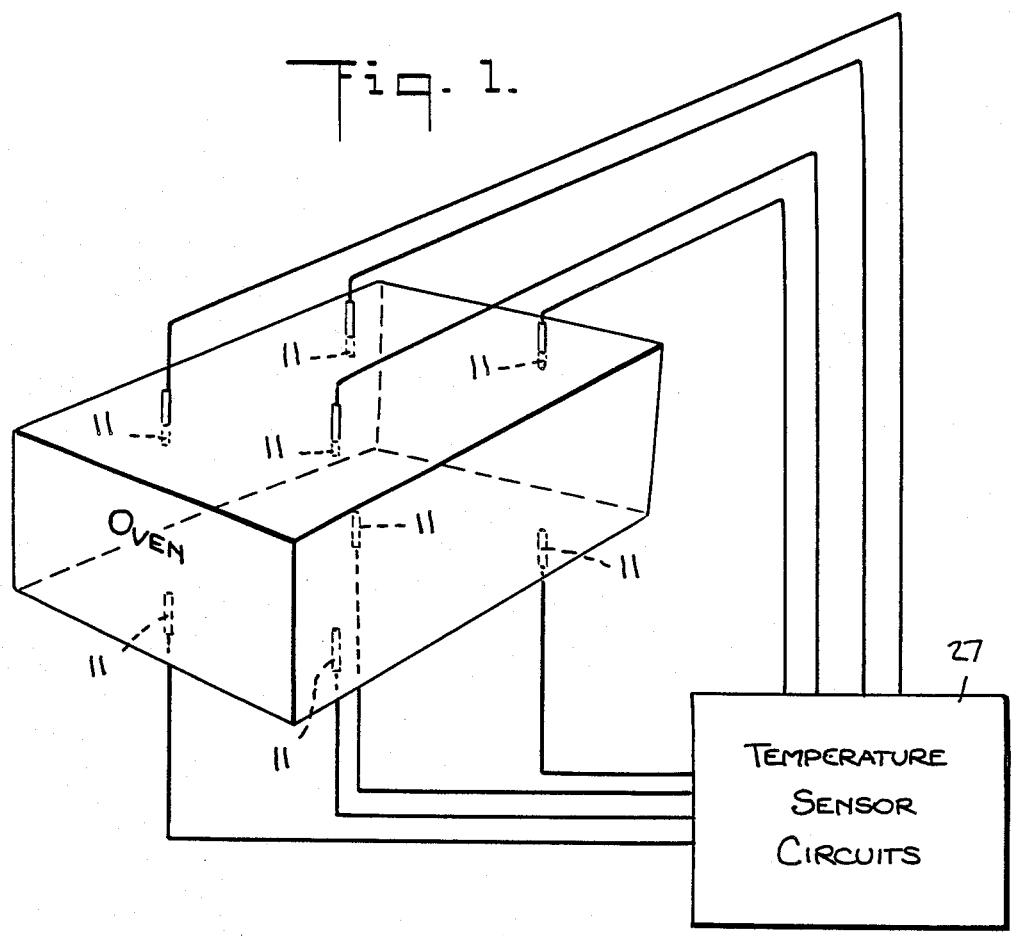

Before referring to the drawings in detail, it will be understood that for purposes of clarity, the apparatus represented in block diagrams in FIGS. 2, 3, 4A, 4B and 6 utilizes, for example, an analog-to-digital converter and a microprocessor which includes such hardware as a central processing unit, program and random access memories, timing and control circuitry, input-output interface devices and other conventional digital subsystems necessary to the operation of the central processing unit as is well understoo by those skilled in the art. The microprocessor operates according to the computer program produced according to the flow charts represented in the drawings.

Referring now more particularly to FIG. 1 of the drawings, there is represented diagrammatically a large commercial baking oven 10 where the product is placed on large movable racks (not shown). The heating is done by hot air flowing over the product. Since it is not possible to place a single temperature probe which ultimately controls the temperature of the air in the center of the product array in large ovens, in accordance with the invention several probes have been placed at selected spaced locations within the oven, as represented diagrammatically, to eliminate variables of temperature, and temperature averaging of the temperature readings of selected probes is accomplished by apparatus constructed in accordance with the invention, as will be more fully described hereinafter. The spaced locations of the temperature probes may be selected by determining locations of different temperatures within the oven.

The provision of multiple probes allows the probes to be scanned and monitored to determine if their readings are acceptable within a predetermined range. If the readings are acceptable, they are included in the temperature average. If the readings are not acceptable, they are not included in the temperature average and the faulty probe is identified by an alarm message.

If a catastrophic failure of any of the probes occurs, for example, a probe that electrically shorts out or has an open circuit, the temperature averaging continues with the probes that remain operative. If a preselected number of probes become inoperative, the computer automatically transfers control of the oven to the manual controls on the oven.

Most large baking ovens have two or more electric heating elements. A switch is used to select manually one element or both, depending on the load. Most power companies set their rates per killowatt hour on the expected peak load. If that peak load or power is consumed during a specified time interval, the charge per killowatt hour is significantly reduced.

In order to minimize the amount of peak power consumed by the oven, two heating elements are utilized together when the operating temperature average TA is less than a predetermined set point temperature minus a temperature differential TD. This occurs in apparatus in accordance with the invention (1) when there is transfer from a lower setback temperature to a higher product baking temperature and also (2) when the apparatus is cooking a product. The setback temperature is a predetermined temperature to which the oven temperature is automatically reduced if a product key has not been depressed during a preceding predetermined time interval. Thus, the maximum power of the oven is utilized only when a product is being cooked or when the oven is being brought up to the product cook temperature as fast as possible. In all other cases, the oven peak power is at a minimum.

When, for example, crusty breads are baked, steam is injected into the oven. In order to control the total baking process (e.g., temperature, cooking time) a precise amount of steam is injected into the oven as part of the process initiated by a product key depression under the control of apparatus constructed in accordance with the invention.

At the end of a crusty bread baking cycle, an oven damper should be opened. This allows moisture captured in the oven to escape and "crackles" the skin of the bread. This damper is electrically controlled as part of the baking cycle under the control of apparatus constructed in accordance with the invention. It is opened and closed at specific times within a baking cycle controlled by a programmed microcomputer.

Figure 2:
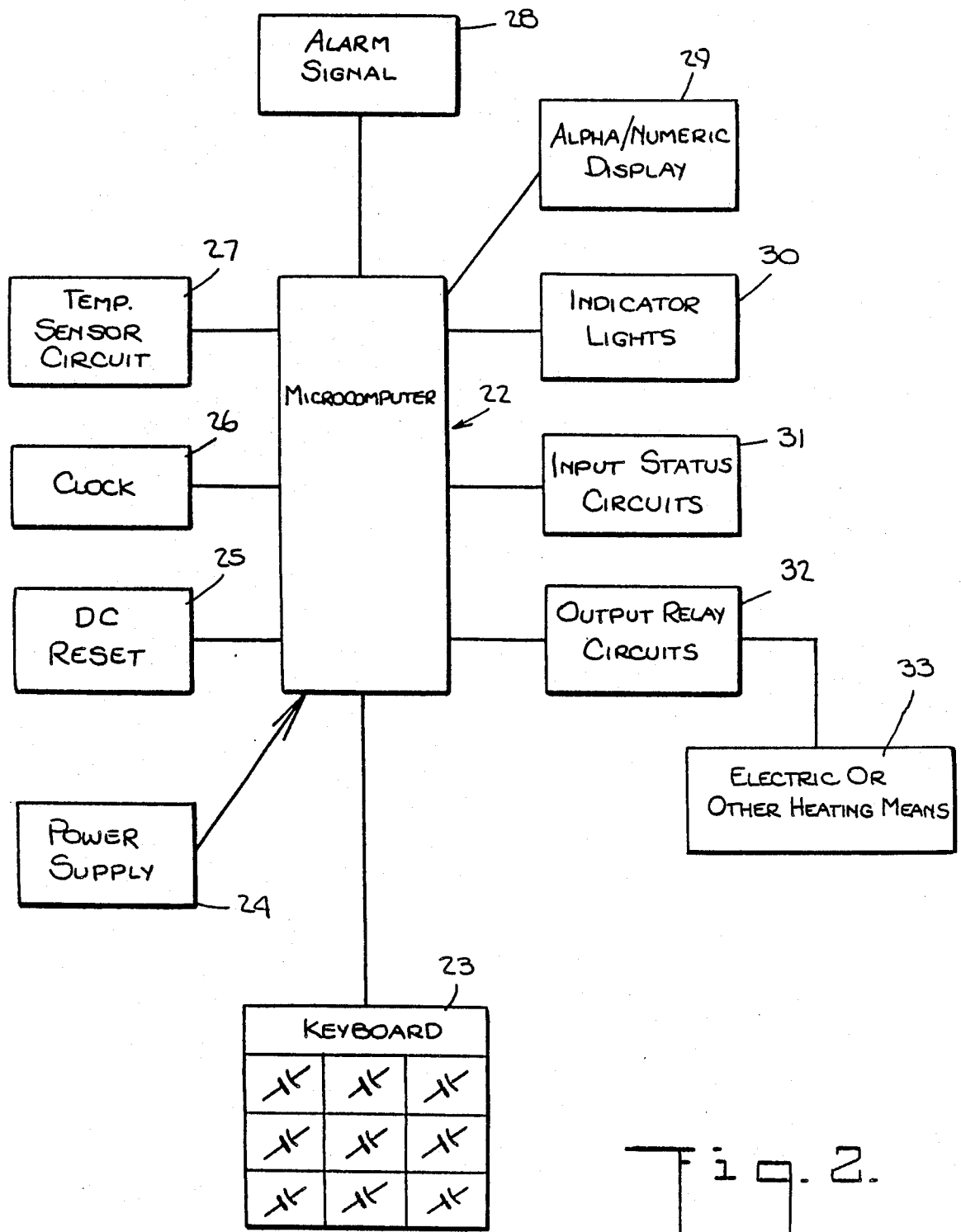
FIG. 2 represents diagrammatically oven control apparatus including a microcomputer and constructed in accordance with the invention.

Referring now more particularly to FIG. 2 of the drawings, a microcomputer 22 includes a central processing unit which may receive an input from a keyboard 23 which may, for example, comprise a capacitive keyboard.

The control includes a conventional power supply 24, a D.C. reset circuit 25 for resetting the microcomputer when renewing power in the power supply, a clock oscillator 26 for providing clock pulses to the microcomputer 22, temperature sensor circuits 27 coupled to temperature probes 11 for sensing the temperature at spaced locations within the cooking oven, an audible alarm 28, an alpha/numeric display 29 and indicator lights 30. The apparatus also includes an input status circuit 31 which may, for example, be responsive to a door switch. The microcomputer controls output relay circuits 32 which may, for example, control electric heating elements or other heating means 33.

Figure 3:
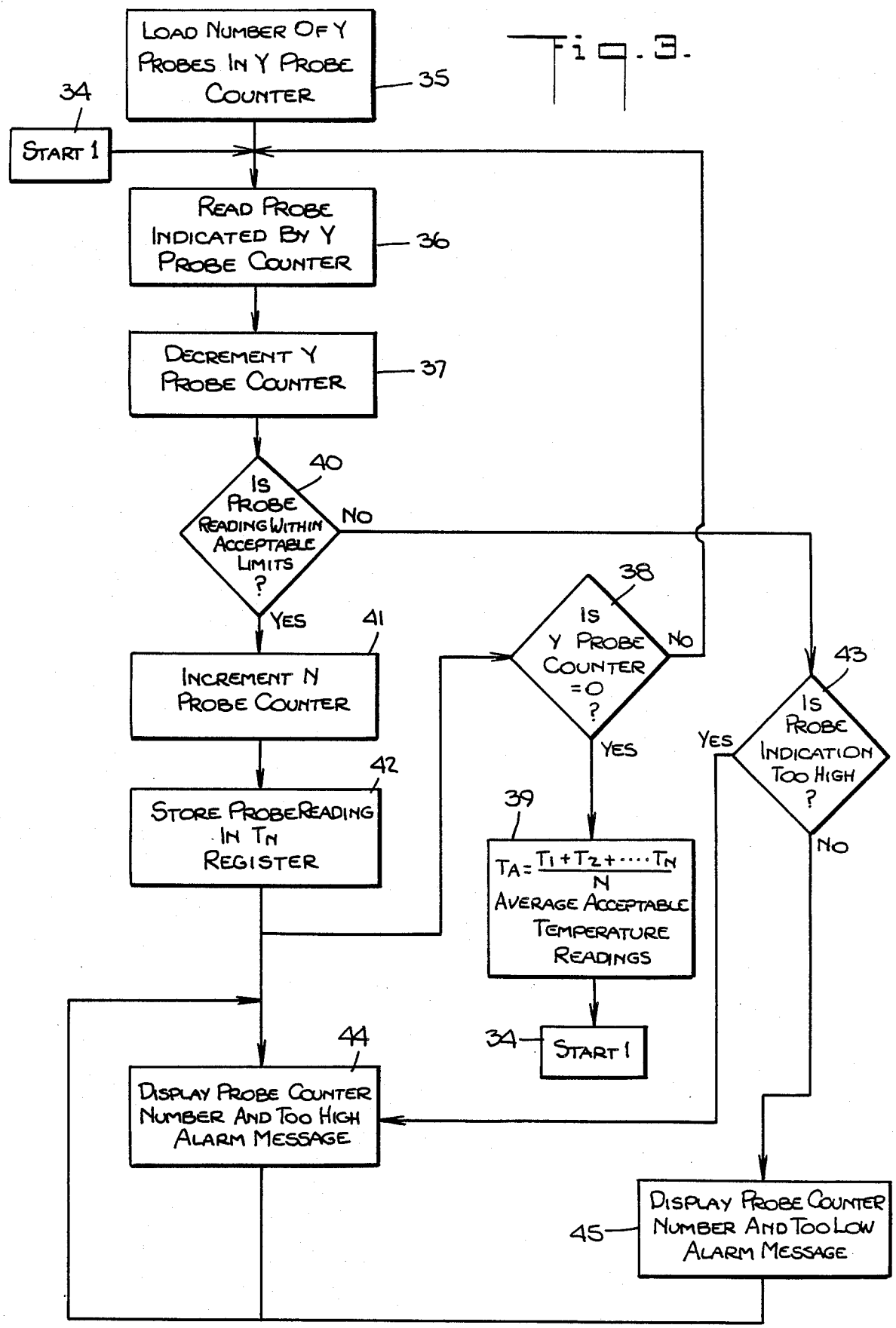

Considering now the programmed microcomputer with reference to the flow chart of FIG. 3, apparatus for averaging the temperatures of a plurality of temperature probes in an oven comprises means for counting the number Y of Y probes in the oven and for storing the number Y thereof and for indicating individual temperature probes successively. This means comprises a "load number of Y probes in Y probe counter" microprocessor portion 35. The apparatus also includes means for reading the temperature of each probe indicated by the Y probe counting and storing means. This means comprises a "read probe indicated by Y probe counter" microprocessor portion 36. The microprocessor portion 36 is actuated by depressing a "start 1" key 34.

A "decrement Y probe counter" microprocessor portion 37 is responsive to the microprocessor portion 36 for decrementing the Y probe counting and storing and probe-indicating means comprising microprocessor portion 35.

The apparatus also includes means for determining whether the Y probe counting and storing and probe-indicating means has been decremented to zero. This means comprises a "is Y probe counter equal to 0?" microprocessor portion 38.

The apparatus also includes means for averaging the temperatures of the Y probes when the Y probe counting and storing and probe indicating means has been decremented to zero. This means is responsive to the "yes" output of the microprocessor portion 38 and comprises "average acceptable temperature readings" microprocessor portion 39 which may be expressed mathematically as $$TA = \frac{T_1 + T_2 + \ldots T_N}{N}$$

where TA is the average temperature of acceptable temperature readings, $T_1 + T_2 \ldots T_N$ indicate acceptable temperature readings from temperature probes and N represents the number of acceptable temperature probes having acceptable temperature readings.

When the microprocessor portion 39 has accomplished the averaging, it actuates the "start 1" microprocessor portion 34 to resume the cycle with the Y probe counter shifting to indicate again the number Y of the Y probes.

Considering now the operation of the FIG. 3 apparatus in greater detail, the apparatus includes means for counting a number N of selected probes. This means comprises an "is probe reading within acceptable limits?" microprocessor portion 40 which responds to the "read probe indicated by Y probe counter" microprocessor portion 36 when the "decrement Y probe counter 37" has decremented the Y probe counter. If the probe reading is within acceptable limits the "yes" output of the microprocessor portion 40 actuates an "increment N probe counter" microprocessor portion 41. Means for incrementing the N selected probe counting means comprises the microprocessor portion 41. The apparatus also includes means for reading the temperature and storing the reading of the number N of the N selected probes. This means comprises a "store probe reading in $T_N$ register" microprocessor portion 42.

The apparatus includes means for averaging the temperatures of the N selected probes when the Y probe counting and storing and probe indicating means has been decremented to zero. This means comprises the "average acceptable temperature readings" microprocessor portion 39. The "is Y probe counter equal to zero?" microprocessor portion 38 is responsive to the "store probe reading in $T_N$ register" microprocessor portion 42 for translating the acceptable temperatures of the N selected probes to the microprocessor portion 39. The microprocessor portion 39 then actuates the "start 1" key 34 as described previously.

If "is Y probe counter equal to zero?" microprocessor portion 38 provides a "no" output, the "no" output is applied to the "read probe indicated by Y probe counter" microprocessor portion 36 for continuing the readings of the probes remaining to be read.

Thus, there is no signal provided by the "yes" output of the microprocessor portion 38 to the "average acceptable temperature readings" microprocessor portion 39 until the number Y of the Y probes have been read and the "is Y probe counter equal to zero?" microprocessor portion 38 provides a "yes" output. The "yes" output of the microprocessor portion 38 then includes readings of the number N of the N selected probes having temperature readings within acceptable limits and stored in the "store probe reading in $T_N$ register" microprocessor portion 42.

If the "is probe reading within acceptable limits?" microprocessor portion 40 provides a "no" output, the "no" output of the microprocessor portion 40 is applied to an "is probe indication too high?" microprocessor portion 43. The microprocessor portion 43 provides a "yes" output to a "display probe counter number and too high alarm message" microprocessor portion and display 44. The output of the microprocessor portion 44 is applied to the "is Y probe counter equal to zero?" microprocessor portion 38 to activate the microprocessor portion 38 but with no translation of the output of microprocessor portion 44 to the microprocessor portion 39.

If the "is probe indication too high?" microprocessor portion 43 provides a "no" output, the "no" output is applied to a "display probe counter number and too low alarm message" microprocessor portion and display 45. The output of the microprocessor portion 45 is also applied to the "is Y probe counter equal to zero?" microprocessor portion 38 to actuate the microprocessor portion 38 but with no translation of the output of microprocessor portion 45 to the microprocessor portion 39.

Figure 4A:
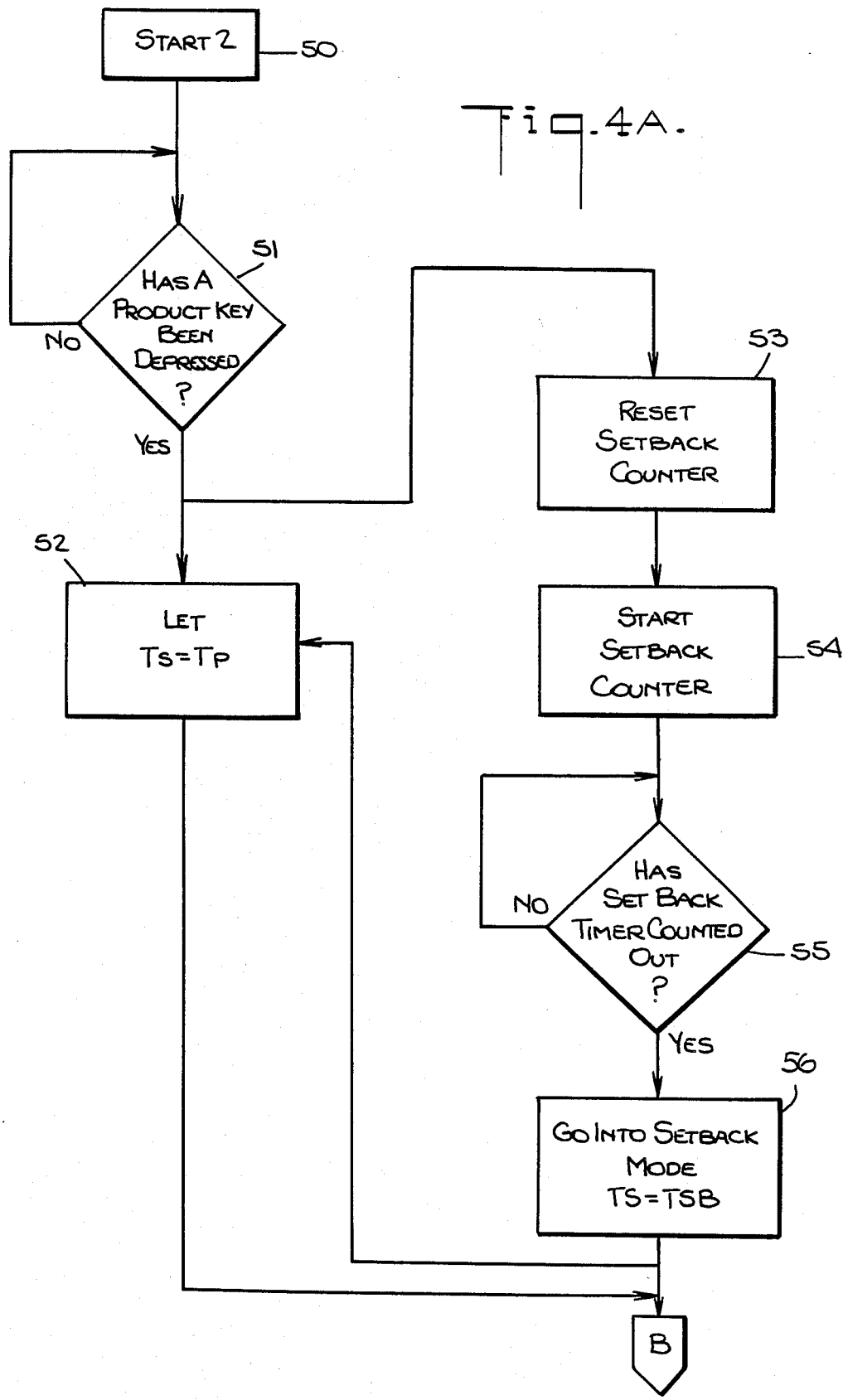

Considering now the apparatus for controlling the temperature of an oven having a plurality of heating means with reference to FIGS. 2, 4A and 4B, the apparatus comprises means for selecting a product to be heated at a predetermined temperature TP. This means comprises a product key of keyboard 23 of FIG. 2. The apparatus includes a "start 2" key 50 of FIG. 4A which is coupled to a "has a product key been depressed?" microprocessor portion 51. The "yes" output of the microprocessor portion 51 is coupled to means for causing a set point temperature TS to be equal to a predetermined heating temperature TP. This means comprises a "let TS equal TP" microprocessor portion 52.

The "no" output of the microprocessor portion 51 is coupled to the input of the microprocessor portion 51 to activate the microprocessor portion 51 again.

The apparatus also includes setback counting means for counting the time interval between the time when the product-selecting means has selected a product to be heated and the end of a predetermined setback time interval and for causing the set point temperature TS to be equal to a predetermined setback temperature TSB which is less than the predetermined heating temperature TP, overriding the means for causing the set point temperature TS to be equal to the predetermined heating temperature TP, thereby reducing power consumption. The setback counting means comprises a "reset setback counter" microprocessor portion 53 coupled to the "yes" output of the microprocessor portion 51. The microprocessor portion 53 is coupled to a "start setback counter" microprocessor portion 54. The microprocessor portion 54 is coupled to a "has setback timer counted out?" microprocessor portion 55. If the setback timer has not counted out, that is, to the predetermined setback time interval, a "no" output is applied to the microprocessor portion 55. If the setback timer has counted out to the predetermined setback time interval, a "yes" output is applied to a "go into setback mode TS equals TSB" microprocessor portion 56. The output of the microprocessor portion 56 is applied to the microprocessor portion 52, overriding the means for causing the set point temperature TS to be equal to the predetermined heating temperature TP. Thus, in the setback mode, the set point temperature TS equals a lower setback temperature TSB.

In either event, whether the set point temperature TS equals the predetermined heating temperature TP or whether the set point temperature TS equals the set back temperature TSB, the set point temperature is applied to a "load set temperature TS" microprocessor portion 57 of FIG. 4B. The microprocessor portion 57 is coupled to a "load temperature differential TD" from microprocessor portion 58.

Figure 5:
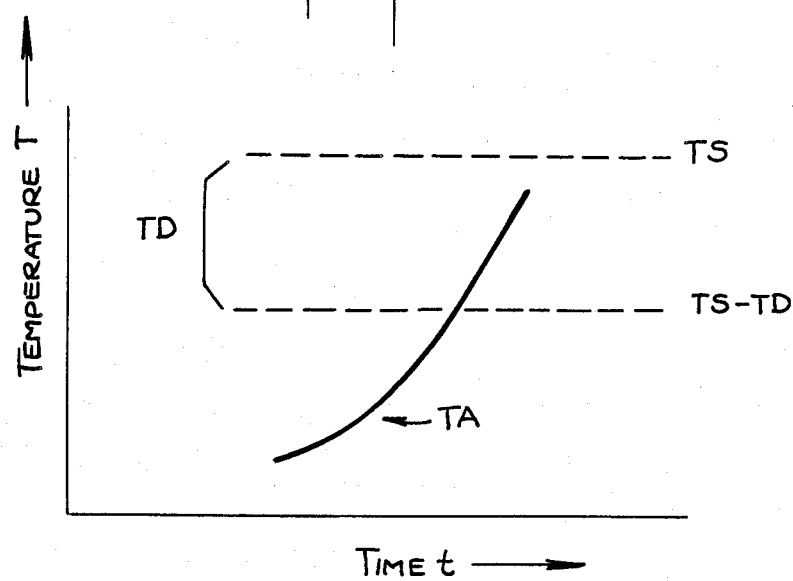
FIG. 5 is a graph representing oven temperature with respect to time.

Referring to the moment to FIG. 5, the set point temperature TS is represented in broken-line construction on a graph of temperature vs. time representing an example of the oven temperature TA. The temperature differential TD is indicated in solid-line construction and the set point temperature TS minus the differential temperature TD is indicated in broken line construction TS-TD.

Referring again to FIG. 4B, the apparatus includes means for storing the set point temperature TS minus a temperature differential TD. This means comprises the "load set point temperature TS" microprocessor portion 57 and the "load differential temperature TD" microprocessor portion 58.

The apparatus also includes means for determining whether the oven temperature TA is less than the set point temperature TS minus the temperature differential TD. This means comprises an "is TA less than (TS-TD)?" microprocessor portion 59. The microprocessor portion 58 is coupled to the "is TA less than (TS-TD)?" microprocessor portion 59. An "apply TA" microprocessor portion 90 is also coupled to the microprocessor portion 59.

The apparatus also includes means for causing first and second heating means to be in an "on" heating condition if the oven temperature TA is less than the set point temperature TS minus the temperature differential TD. This means comprises the "yes" output of the "is TA less than (TS-TD)?" microprocessor portion 59 which is coupled to a "turn on heating element 1 and turn on heating element 2" microprocessor portion 60. The heating elements 1 and 2 preferably are electrical heating elements (not shown) in the oven. The output of the microprocessor portion 60 couples a signal representing the oven temperature TA to the input of the microprocessor portion 59. The "apply TA" microprocessor portion 90 is de-activated after it has initially supplied the oven temperture TA to microprocessor portion 59.

The apparatus also includes means for causing the first and second heating means to be in an "off" condition if the oven temperature TA is not less than the set point temperature TS. This means comprises the "no" output of the microprocessor portion 59 coupled to an "is TA less than TS?" microprocessor portion 61. The "no" output of the microprocessor portion 61 is coupled to a "turn off heating element 1 and turn off heating element 2" microprocessor portion 62. The output of the microprocessor portion 62 representing the oven temperature TA is coupled to the input of the microprocessor portion 59.

The apparatus also includes means for causing the first and second heating means to be in an "off" condition if the oven temperature TA is not less than the set point temperature TS. This means comprises the "yes" output of the "is TA less than TS?" microprocessor portion 61. The "yes" output of the microprocessor portion 61 is coupled to an "is TA rising?" microprocessor portion 63. Means for determining whether the oven temperature TA is rising comprises the "is TA rising?" microprocessor portion 63.

The apparatus also includes means for causing the first and second heating means to be in an "off" condition if the oven temperature TA is less than the set point temperature TS and the oven temperature TA is rising. This means comprises the "yes" output of the microprocessor portion 63 which is coupled to the "turn off heating element 1 and turn off heating element 2" microprocessor portion 62.

The apparatus also includes means for causing one of the heating means to be in an "on" condition and the other of the heating means to be in an "off" condition if the oven temperature TA is less than the set point temperature TS and the oven temperature TA is not rising. This means comprises the "no" output of the microprocessor portion 63 coupled to a "turn on heating element 1 and turn off heating element 2" microprocessor portion 64. The microprocessor portion 64 couples an output representing the oven temperature TA to the input of the microprocessor portion 59.

Figure 6:
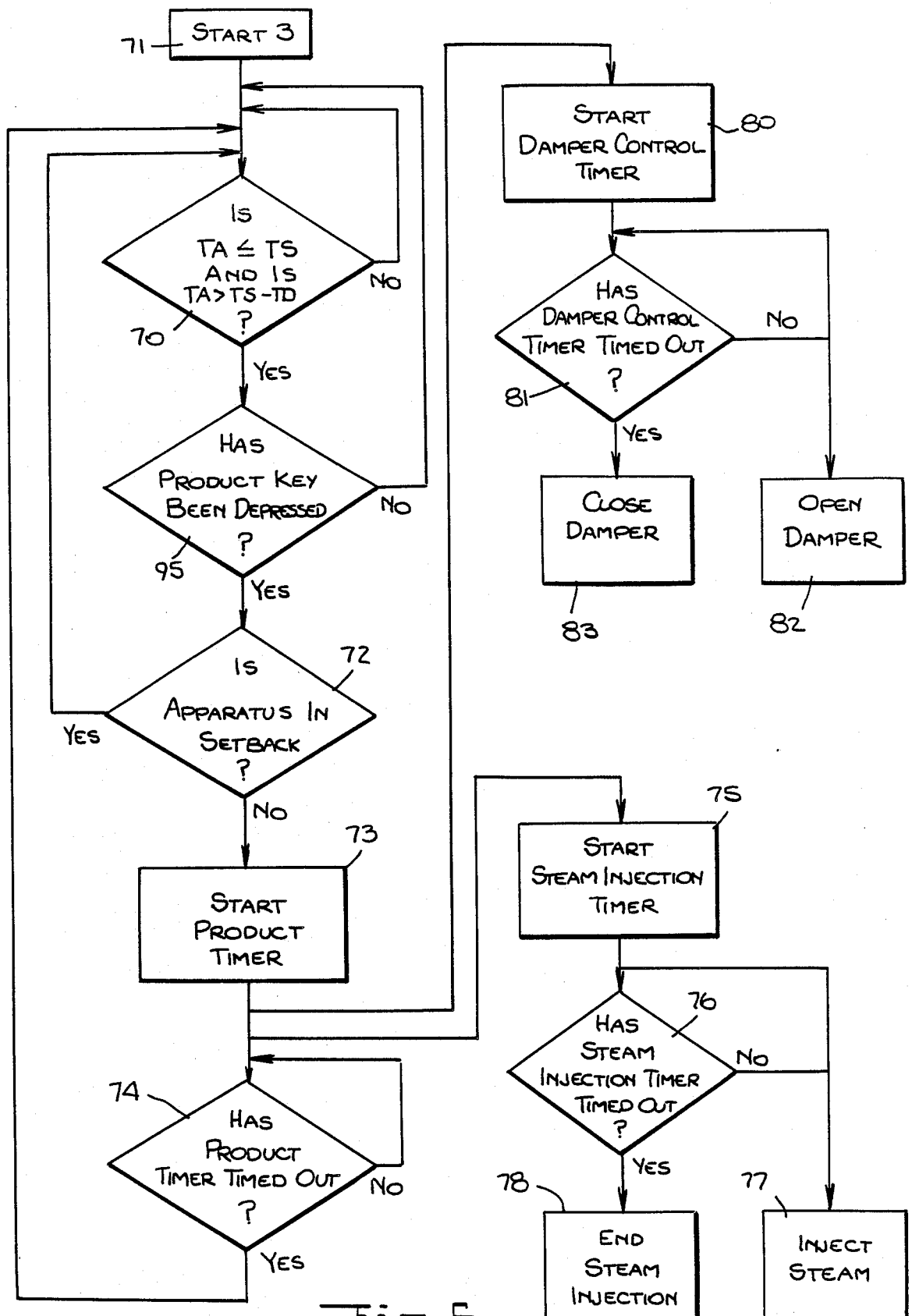
FIG. 6 is a flow chart comprising a representation of a portion of a microcomputer which operates according to a computer program produced according to the flow chart.

Referring now more particularly to FIG. 6, there is represented apparatus for controlling the steam in an oven comprising means for averaging the temperatures of N selected temperature probes in an oven to provide an average temperature TA. This averaging means comprises the average acceptable temperature readings microprocessor portion 39 of FIG. 3. The apparatus also includes means for determining whether the average temperature TA less than or equal to a set point temperatue TS and whether the average temperature TA is greater than the set point temperature TS minus a temperature differential TD. This means comprises an "is TA less than or equal to TS and is TA greater than TS minus TD?" microprocessor portion 70. A "start 3" key 71 is coupled to the input of the microprocessor portion 70 and the "no" output of the microprocessor portion 70 is also coupled to the input of the microprocessor portion 70.

The apparatus also includes means for determining whether a product to be processed in the oven has been selected. This means comprises a "has product key been depressed?" microprocessor portion 95. The "no" output of the microprocessor portion 95 is coupled to the input of the microprocessor portion 70.

The apparatus also includes means for determining whether the apparatus is operating in a setback temperature mode TSB when the product has been selected. This means comprises an "is apparatus in setback?" microprocessor portion 72 coupled to the "yes" output of the microprocessor portion 95. The "yes" output of the microprocessor portion 72 is coupled to the input of the microprocessor portion 70. The "no" output of the microprocessor portion 72 is coupled to means responsive to a signal that the apparatus is not operating in a setback temperature mode for timing the processing of the selected process. This means comprises the "start timer" product timer 73. The apparatus also includes means for timing the injection of steam into the oven. This means comprises a "has product timer timed out?" microprocessor portion 74 having a "no" output coupled to the input of the microprocessor portion 74 and having a "yes" output coupled to the input of the microprocessor portion 40.

The means for timing the injection of steam into the oven also comprises a "start steam injection" timer 75 coupled to the output of the microprocessor portion 73. A "has steam injection timer timed out?" microprocessor portion 76 is coupled to the output of the microprocessor portion 75. The "no" output of the microprocessor portion 76 is coupled to the input of the microprocessor portion 76 and is coupled to an "inject steam" microprocessor portion 77. The "yes" output of the microprocessor portion 76 is coupled to an "end steam injection" microprocessor portion 78.

The apparatus also includes means for timing the operation of damping means for releasing steam from the oven. This means includes a "start damper control timer" microprocessor portion 80 coupled to a "has damper control timer turned out?" microprocessor portion 81. The "no" output of the microprocessor portion 81 is coupled to the input of the microprocessor portion 81. The "no" output of the microprocessor portion 81 is also coupled to the "open damper" microprocessor portion 82. The "yes" output of the microprocessor portion 81 is coupled to a "close damper" microprocessor portion 83.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for averaging the temperatures of a plurality of temperature probes in an oven comprising:
    means for counting the number Y of Y probes in the oven and for storing said number Y thereof and for indicating individual probes successively;
    means for reading the temperature of each probe indicated by said Y probe counting and storing means;
    means for decrementing said Y probe counting and storing and probe-indicating means;
    means for determining whether said Y probe counting and storing and probe-indicating means has been decremented to zero; and
    means for averaging the temperatures of said Y probes when said Y probe counting and storing and probe indicating means has been decremented to zero.

2. Apparatus for averaging the temperatures of a plurality of selected temperature probes in an oven comprising:
    means for counting the number Y of Y probes in the oven and for storing the number Y thereof and for indicating individual probes successively;
    means for reading the temperature of each probe indicated by said Y probe counting and storing means;
    means for counting a number N of selected probes;
    means for incrementing said N selected probe counting means;
    means for decrementing said Y probe counting and storing and probe-indicating means;
    means for reading the temperature and storing the reading of said number N of said N selected probes;
    means for determining whether said Y probe counting and storing and probe-indicating means has been decremented to zero; and
    means for averaging the temperatures of said N selected probes when said Y probe counting and storing and probe-indicating means has been decremented to zero.

3. Apparatus in accordance with claims 2 which includes means for determining whether the temperature of each of said N selected probes is within predetermined acceptable limits.

4. Apparatus in accordance with claim 3 in which said means for incrementing said N selected probe counting means increments said N selected probe counting means if the temperature of a probe of said N selected probes is within said predetermined acceptable limits.

5. Apparatus in accordance with claim 3 in which said means for reading the temperature and storing the reading of said number N of N selected probes stores the reading of a probe of said N selected probes if the temperature thereof is within acceptable limits.

6. Apparatus in accordance with claim 3 in which said means for determining whether said Y probe counting and storing and probe-indicating means has been decremented to zero makes such determination if the temperature of a probe of said N selected probes is within acceptable limits.

7. Apparatus in accordance with claim 3 in which said means for averaging the temperature of said N selected probes includes a probe of said N selected probes if the temperature thereof is within acceptable limits.

8. Apparatus in accordance with claim 3 in which said means for determining whether said Y probe counting and storing and probe-indicating means has been decremented to zero is responsive to said Y probe counting and storing and probe-indicating means if the temperature of a probe of said N selected probes is within said predetermined acceptable limits.

9. Apparatus in accordance with claim 3 which includes means for determining whether the temperature of each of said N selected probes is too high or too low and in which said means for determining whether the temperature of each of said N selected probes is within acceptable limits actuates said too-high or too-low temperature-determining means if the temperature of a probe of said N selected probes is outside acceptable limits.

10. Apparatus in accordance with claim 9 in which, when the temperature of one of said N selected probes is outside acceptable limits, displays an identification of said one of said N selected probes.

11. Apparatus in accordance with claim 10 which, when the temperature of said one of said N selected probes is outside acceptable limits, displays a too-high or too-low alarm message.

12. Apparatus in accordance with claim 9 in which said means for determining whether said probe counting and storing and probe-indicating means has been decremented to zero is responsive to said too-high or too-low temperature-determining means if the temperature of a probe of said N selected probes is outside acceptable limits.

13. Apparatus for controlling the temperature of an oven having a plurality of heating means comprising:
    means for selecting a product to be heated at a predetermined temperature TP;
    means for setting a set point temperature TS to be equal to said predetermined heating temperature TP;
    setback counting means for counting a time interval between a time when said product-selecting means has selected a product to be heated and the end of a predetermined setback time interval and for setting said set point temperature TS to be equal to a predetermined setback temperature TSB which is less than said predetermined heating temperature TP, overriding said means for setting said set point temperature TS to be equal to said predetermined heating temperature TP, thereby reducing power consumption.

14. Apparatus in accordance with claim 13 which includes means for storing said set point temperature TS minus a predetermined temperature differential TD;
   means for determining whether an oven temperature TA is less than said set point temperature TS minus said temperature differential TD;
   means for causing first and second heating means to be in an "on" heating condition if said oven temperature TA is less than said set point temperature TS minus said temperature differential TD;
   means for determining whether said oven temperature TA is less than said set point temperature TS if said oven temperature TA is not less than said set point temperature TS minus said temperature differential TD;
   means for causing said first and second heating means to be in an "off" condition if said oven temperature TA is not less than said set point temperature TS;
   means for determining whether said oven temperature TA is rising;
   means for causing said first and second heating means to be in an "off" condition if said oven temperature TA is less than said set point temperature TS and said oven temperature TA is rising; and
   means for causing one of said heating means to be in an "on" condition and the other of said heating means to be in an "off" condition if said oven temperature TA is less than said set point temperature TS and said oven temperature TA is not rising.

15. Apparatus for controlling steam in an oven comprising:
   means for averaging the temperatures of N selected temperature probes in an oven to provide an average temperature TA;
   means for determining whether the average temperature TA is less than or equal to a set point temperature TS and whether the average temperature TA is greater than the set point temperature TS minus a predetermined temperature differential TD;
   means for determining whether a product to be processed in the oven has been selected;
   means for determining whether the apparatus is operating in a setback temperature TSB mode when the product has been selected;
   means responsive to a signal that the apparatus is not operating in a setback temperature mode for timing the processing of the selected product; and
   means for timing the injection of steam into the oven.

16. Apparatus in accordance with claim 15 which includes means for timing the operation of damping means for releasing steam from the oven.

17. Apparatus for averaging the temperatures of a plurality of temperature probes in a cooking apparatus comprising:
   means for counting the number Y of Y probes in the cooking apparatus and for storing said number Y thereof and for indicating individual probes successively;
   means for reasding the temperature of each probe indicated by said Y probe counting and storing means;
   means for decrementing said Y probe counting and storing and probe-indicating means;
   means for determining whether said Y probe counting and storing and probe-indicating means has been decremented to zero; and
   means for averaging the temperatures of said Y probes when said Y probe counting and storing and probe indicating means has been decremented to zero.

18. Apparatus for averaging the temperatures of a plurality of selected temperature probes in a cooking apparatus comprising:
   means for counting the number Y of Y probes in the cooking apparatus and for storing the number Y thereof and for indicating individual probes successively;
   means for reading the temperature of each probe indicated by said Y probe counting and storing means;
   means for counting a number N of selected probes;
   means for incrmeneting said N selected probe counting means;
   means for decrementing said Y probe counting and storing and probe-indicating means;
   means for reading the temperature and storing the reading of said number N of said N selected probes;
   means for determining whether said Y probe counting and storing and probe-indicating means has been decremented to zero; and
   means for averaging the temperatures of said N selected probes when said Y probe counting and storing and probe-indicating means has been decremented to zero.

19. Apparatus in accordance with claim 18 which includes means for determining whether the temperature of each of said N selected probes is within predetermined acceptable limits.

20. Apparatus in accordance with claim 19 in which said means for incrementing said N selected probe counting means increments said N selected probe counting means if the temperature of a probe of said N selected probes is within said predetermined acceptable limits.

21. Apparatus in accordance with claim 19 in which said means for reading the temperature and storing the reading of said number N of N selected probe stores the reading of a probe of said N selected probes if the temperature thereof is within acceptable limits.

22. Apparatus in accordance with claim 19 in which said means for determining whether said Y probe counting and storing and probe-indicating means has been decremented to zero makes such determination if the temperature of a probe of said N selected probes is within acceptable limits.

23. Apparatus in accordance with claim 19 in which said means for averaging the temperature of said N selected probes includes a probe of said N selected probes if the temperature thereof is within acceptable limits.

24. Apparatus in accordance with claim 19 in which said means for determining whether said Y probe counting and storing and probe-indicating means has been decremented to zero is responsive to said Y probe counting and storing said probe-indicating means if the temperature of a probe of said N selected probes is within said predetermined acceptable limits.

25. Apparatus in accordance with claim 19 which includes means for determining whether the temperature of each of said N selected probes is too high or too low and in which said means for determining whether the temperature of each of said N selected probes is within acceptable limits actuates said too-high or too-low temperature-determining means if the temperature of a probe of said N selected probes is outside acceptable limits.

26. Apparatus in accordance with claim 25 in which, when the temperature of one of said N selected probes is outside acceptable limits, displays an identification of said one of said N selected probes.

27. Apparatus in accordance with claim 26 which, when the temperature of said one of said N selected probes is outside acceptable limits, display a too-high or too-low alarm message.

28. Apparatus in accordance with claim 25 in which said means for determining whether said probe counting and storing and probe-indicating means has been decremented to zero is responsive to said too-high or too-low temperature-determining means if the temperature of a probe of said N selected probes is outside acceptable limits.

29. Apparatus for controlling the temperature of a cooking apparatus having a plurality of heating means comprising:
    means for selecting a product to be heated at a predetermined temperature TP;
    means for setting a set point temperature TS to be equal to said predetermined heating temperature TP;
    setback counting means for counting a time interval between a time when said product-selecting means has selected a product to be heated and the end of a predetermined setback time interval and for setting said set point temperature TS to be equal to a predetermined setback temperature TSB which is less than said predetermined heating temperature TP, overriding said means for setting said set point temperature TS to be equal to said predetermined heating temperature TP, thereby reducing power consumption.

30. Apparatus in accordance with claim 29 which includes means for storing said set point temperature TS minus a predetermined temperature differential TD;
    means for determining whether a cooking apparatus temperature TA is less than said set point temperature TS minus said temperature differential TD;
    means for causing first and second heating means to be in an "on" heating condition if said cooking apparatus temperature TA is less than said set point temperature TS minus said temperature differential TD;
    means for determining whether said cooking apparatus temperature TA is less than said set point temperature TS if said oven temperature TA is not less than said set point temperature TS minus said temperature differential TD;
    means for causing said first and second heating means to be in an "off" condition if said cooking apparatus temperature TA is not less than said set point temperature TS;
    means for determining whether said cooking temperature TA is rising;
    means for causing said first and second heating means to be in an "off" condition if said cooking apparatus temperature TA is less than said set point temperature TS and said cooking apparatus temperature TA is rising; and
    means for causing one of said heating means to be in an "on" condition and the other of said heating means to be in an "off" condition if said cooking apparatus temperature TA is less than said set point temperature TS and said cooking apparatus temperature TA is not rising.

31. Apparatus for controlling steam in cooking apparatus comprising:
    means for averaging the temperatures of N selected temperature probes in a cooking apparatus to provide an average temperature TA;
    means for determining whether the average temperature TA is less than or equal to a set point temperature TS and whether the average temperature TA is greater than the set point temperature TS minus a predetermined temperature differential TD;
    means for determining whether a product to be processed in the cooking apparatus has been selected;
    means for determining whether the apparatus is operating in a setback temperature TSB mode when the product has been selected;
    means responsive to a signal that the apparatus is not operating in a setback temperature mode for timing the processing of the selected product; and
    means for timing the injection of steam into the cooking apparatus.

32. Apparatus in accordance with claim 31 which includes means for timing the operation of damping means for releasing steam from the cooking apparatus.

* * * * *

UNITED STATES PATENT AND TRADEMARK OFFICE
CERTIFICATE OF CORRECTION

PATENT NO. : 4,782,445

DATED : November 1, 1988

INVENTOR(S) : Mario Pasquini

It is certified that error appears in the above-identified patent and that said Letters Patent is hereby corrected as shown below:

Column 1, line 42 for "the invention" read -- with the invention --.

Column 12, line 14 for "incrmeneting" read -- incrementing --.

Column 14, lines 14-15 for "tmeperature" read -- temperature --.

Signed and Sealed this

First Day of August, 1989

Attest:

DONALD J. QUIGG

Attesting Officer

Commissioner of Patents and Trademarks